United States Patent
Hurd et al.

[11] Patent Number: 5,433,490
[45] Date of Patent: Jul. 18, 1995

[54] COOKER DIE REMOVABLY SECURING MECHANISM

[75] Inventors: Ronald D. Hurd, Minnetonka; Stanley G. Liedman, Maple Grove, both of Minn.

[73] Assignee: General Mills, Inc., Minneapolis, Minn.

[21] Appl. No.: 238,567

[22] Filed: May 9, 1994

[51] Int. Cl.⁶ .................... F16L 19/00; F16L 23/036
[52] U.S. Cl. .................... 285/360; 285/362; 285/913; 285/27; 285/363
[58] Field of Search ............. 285/912, 913, 360, 362, 285/394, 363, 364, 308, 309, 27

[56] References Cited

U.S. PATENT DOCUMENTS

| | | | |
|---|---|---|---|
| 1,097,508 | 5/1914 | Bailey | 285/362 |
| 1,663,755 | 3/1928 | Gammeter | 285/362 |
| 2,710,763 | 6/1955 | Gilbert | 285/913 |
| 3,120,402 | 2/1964 | Wallen | 285/912 |
| 3,700,267 | 10/1972 | Piegza | 285/362 |
| 4,097,069 | 6/1978 | Morrill | 285/362 |
| 4,722,357 | 2/1988 | Bormioli | 285/912 |
| 4,990,022 | 2/1991 | Watanabe et al. | 285/362 |

*Primary Examiner*—Eric K. Nicholson
*Attorney, Agent, or Firm*—John A. O'Toole; L. MeRoy Lillehaugen; Alan D. Kamrath

[57] ABSTRACT

Mechanism (10) for removably securing a die (22) to the flange (18) of a discharge (14) of a cooker (12) is disclosed including first and second connector rings (30, 56). The first connector ring (30) is rotatably mounted to the flange (18) of the cooker (12) by its securement to C-shaped carrier members (38) rotatably mounted to C-shaped collar members (32) secured to the flange (18). The first connector ring (30) includes a plurality of circumferentially spaced, wedge-shaped teeth (46) extending radially inwardly. The second connector ring (56) is secured to the flange (24) of the die (22) and includes a plurality of circumferentially spaced, wedge-shaped teeth (66) extending radially outward. The second connector ring (56) is axially movable such that the teeth (66) thereof pass axially between the teeth (46) of the first connector ring (30) in an unlocked position. The first connector ring (30) can be rotated by a hydraulic cylinder (52) to a locked position with the teeth (46, 66) of the connector rings (30, 56) axially abutting and camming the flanges (18, 24) of the cooker (12) and the die (22) together to secure the die (22) to the cooker (12).

20 Claims, 2 Drawing Sheets

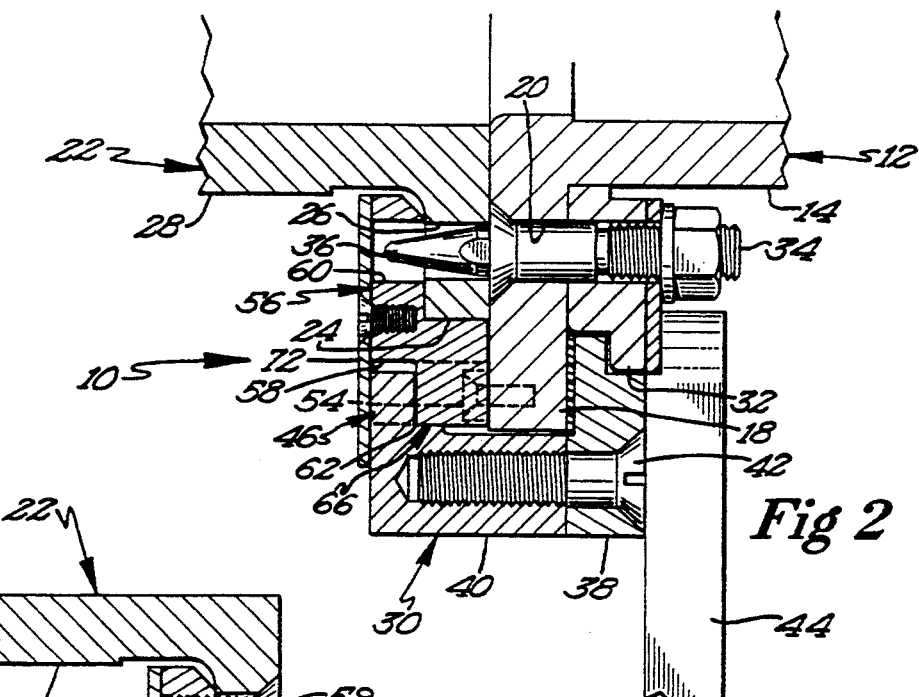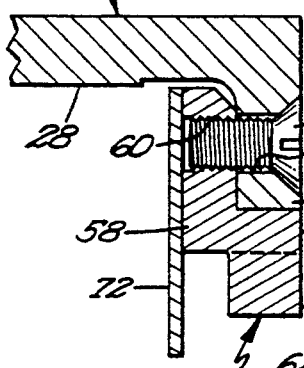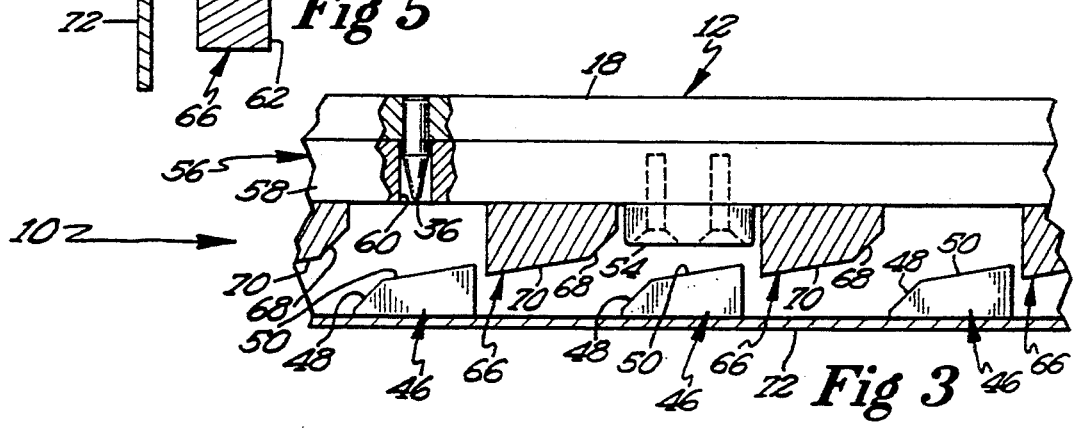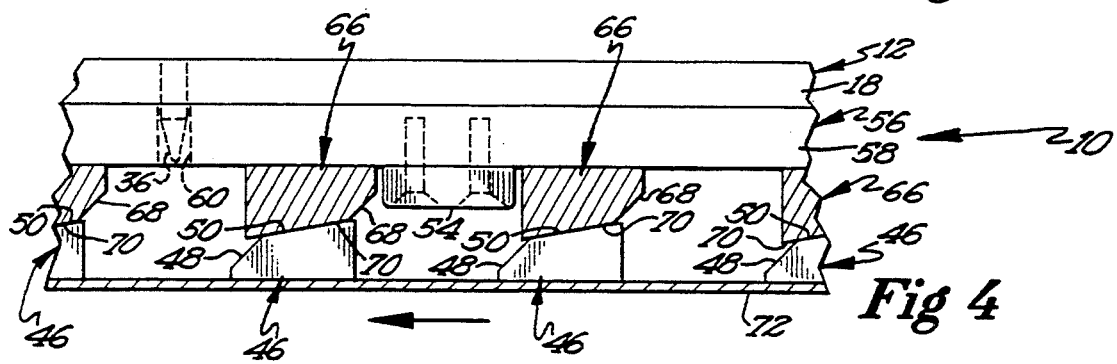

5,433,490

COOKER DIE REMOVABLY SECURING MECHANISM

BACKGROUND

The present invention generally relates to mechanisms for removably securing a die to the discharge of a cooker and particularly relates to mechanisms for allowing the quick and easy change of a die to the discharge of a cooker.

During the normal operation of a cooker/extruder, it becomes necessary and/or desirable to change the die from which the extrudate passes from the cooker. For example, the die often becomes plugged, requiring it to be replaced with a clean one. Similarly, the die may be replaced with a die extruding extrudates of a differing configuration and/or size. Conventionally, dies were secured to cookers by a plurality of fasteners which were required to be removed and replaced each time the die was desired to be replaced. In addition to being very time consuming, removal and replacement of such fasteners typically required several personnel including mechanics. Further, in addition to personnel costs, the time required to replace the die takes the cooker out of production and loses the steady state conditions for the cooker, with the amount of recovery time to steady state conditions being directly dependent on the time that the cooker is down.

Thus, a need exists for a mechanism that allows for the removable securement of the die to the cooker which does not require the removal and replacement of a plurality of fasteners and which reduces the time and personnel required to replace the die.

It is thus an object of the present invention to provide a novel mechanism for removably securing a die to a cooker.

It is further an object of the present invention to provide such a novel cooker die removably securing mechanism which does not require fasteners between the flange of the cooker and the die.

It is further an object of the present invention to provide such a novel cooker die removably securing mechanism which reduces the time to replace the die.

It is further an object of the present invention to provide such a novel cooker die removably securing mechanism which reduces the personnel required to replace the die.

It is further an object of the present invention to provide such a novel cooker die removably securing mechanism resulting in improved product quality due to more frequent die changes.

It is further an object of the present invention to provide such a novel cooker die removably securing mechanism resulting in quicker system start-ups such as following down weekends.

It is further an object of the present invention to provide such a novel cooker die removably securing mechanism requiring less downtime in replacing dies.

It is further an object of the present invention to provide such a novel cooker die removably securing mechanism resulting in increased productivity.

It is further an object of the present invention to provide such a novel cooker die removably securing mechanism having reduced ingredient losses.

SUMMARY

Surprisingly, the above objects and other aims can be satisfied in the field of securing dies to cookers by providing, in the preferred form, a plurality of teeth of a second connector ring being axially movable between a plurality of teeth of a first connector ring in an unlocked position and axially abutting with the teeth of the first connector ring when rotated to a locked position, with the teeth camming the flanges of the cooker and die together as the first connector ring rotates from the unlocked position to the locked position in the most preferred form.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a partial, cross-sectional view of the cooker die removably securing mechanism of FIG. 1.

FIG. 3 shows a diagramatic, cross-sectional view of the cooker die removably securing mechanism of FIG. 1 according to section line 3—3 of FIG. 1

FIG. 4 shows a diagramatic, cross sectional view of the cooker die removably securing mechanism of FIG. 1 with the first connector ring rotated to its locked position.

FIG. 5 shows a partial, cross-sectional view of the cooker die and second connector ring of the cooker die removably securing mechanism of FIG. 1.

Figure 1:
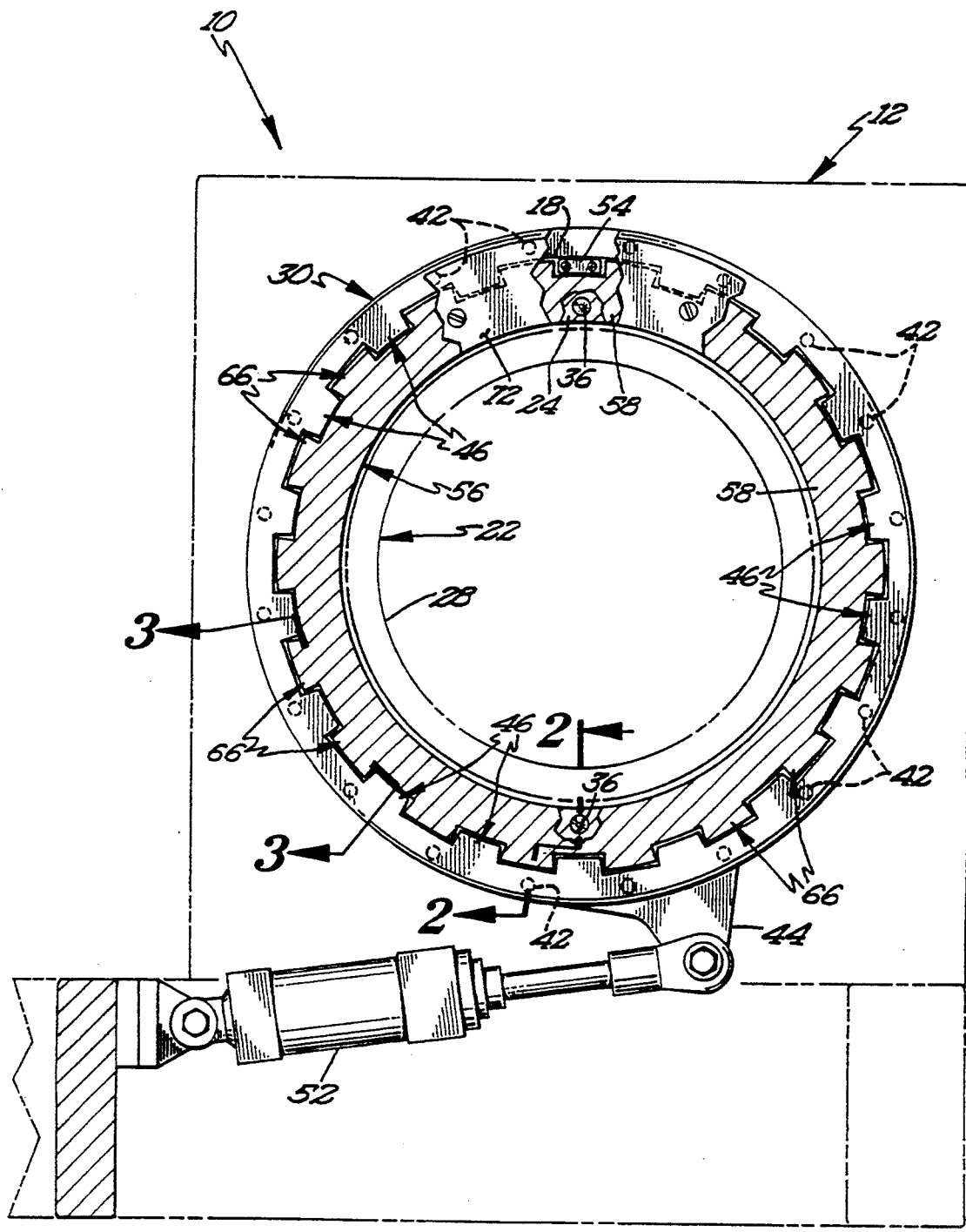
FIG. 1 shows a cross-sectional view of a mechanism for removably securing a die to a cooker/extruder according to the preferred teachings of the present invention, with portions broken away to show constructional details.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "front", "back", "height", "width", "length", "end", "side", "horizontal", "vertical", "axial", "radial", and similar terms are used herein, it should be understood that these terms have reference only to the structure shown in the drawings as it would appear to a person viewing the drawings and are utilized only to facilitate describing the invention.

DESCRIPTION

Mechanism for removably securing a die to a continuous cooker/extruder for allowing the quick and easy removal and/or installation of the die to the cooker/extruder according to the preferred teachings of the present invention is shown in the drawings and generally designated 10. Particularly, mechanism 10 of the most preferred form is shown utilized on a continuous cooker 12 including a cylindrical discharge 14 in which an auger is rotatably received. Discharge 14 terminates in a radially extending flange 18 having circumferentially spaced, axially extending die attachment apertures 20 formed therein. Die 22 includes an attachment flange 24 having circumferentially spaced, axially extending apertures 26 of a size, shape, and location corresponding to apertures 20 of cooker 12. Prior to the present invention, bolts or other fasteners extended through apertures 20 and 26, with approximately 32 apertures 20 and 26 and bolts being typically provided in flanges 18 and 24. Die 22 further includes a die portion 28 of a variety of configurations such as of an axially extending cylindrical portion including radial extrusion apertures formed therein.

Mechanism 10 according to the preferred teachings of the present invention generally includes a first connector ring 30 which is rotatably mounted to flange 18 of discharge 14. Specifically, in the most preferred form where the front and back faces of flange 18 are both machined to be planar and parallel, first and second C-shaped collar members 32 are secured to the back face of flange 18 by bolts 34 which extend through apertures 20 of flange 18 and through apertures formed in collar members 32. The outer periphery of collar members 32 is of a size smaller than the periphery of flange 18 and includes a circumferential groove. First and second C-shaped carrier members 38 are further provided having an inner periphery including a circumferential lip for slideable receipt in the circumferential groove of collar members 32, with carrier members 38 slideably abutting with the back face of flange 18 and extending beyond the outer periphery of flange 18. Connector ring 30 includes a cylindrical portion 40 having an inner portion of a size and shape for slideable and rotatable receipt on the outer periphery of flange 18. Bolts 42 extend through carrier members 38 and are threaded into the inner axial end of cylindrical portion 40. It can then be appreciated that the attachment of carrier members 38 to cylindrical portion 40 holds carrier members 38 in an annular configuration. Further, it can be appreciated that collar members 32 and carrier members 38 rotatably mount connector ring 30 to flange 18 of discharge 14. However, other assemblies can be utilized to rotatably mount connector ring 30 to flange 18. For example, when only the front face of flange 18 is machined, connector ring 30 could be rotatably mounted to a spacer ring secured to flange 18 and abutting with the front face of flange 18.

In the most preferred form, apertures 20 are counter bored at the front face of flange 18 such that the heads of bolts 34 do not extend beyond the front face of flange 18. However, in the preferred form, some of bolts 34 and in the most preferred form bolts 34 at the 6-o'clock and 12-o'clock positions include an alignment pin 36 of a size and shape for slideable receipt in the corresponding apertures 26 of flange 24 of die 22. Alignment pins 36 terminate in free ends. A clevis 44 can be attached to one collar member 32 such as by bolts 42 or by separate bolts which are threaded into collar member 32 spaced from bolts 42.

Connector ring 30 further includes a series of equally circumferentially spaced teeth 46 extending radially inwardly from the front axial end of cylindrical portion 40 and terminating in radially inner free ends. Teeth 46 are axially spaced from the front face of flange 18 greater than the axial spacing of the free ends of alignment pins 36 from the front face of flange 18. Each tooth 46 is generally of a wedge shape in a circumferential direction and specifically includes a first ramp portion 48 and a second lock portion 50. Ramp portion 48 has an inner face which extends at an angle in the order of 45° from the front face of flange 18. Lock portion 50 has an inner face which extends at an angle in the range of 5° to 30° and in the most preferred form in the order of 5° to 15° from the front face of flange 18.

In the most preferred form, connector ring 30 is rotated by an extendable and retractable hydraulic cylinder 52 having a first end pivotally secured to cooker 12 and a second end pivotally secured to clevis 44. In the preferred form, cylinder 52 is stroked utilizing an electro-hydraulic pump. In the most preferred form, 18 teeth 46 are provided, with the circumferential spacing between teeth 46 being equal to the circumferential width of teeth 46. Cylinder 52 rotates connector ring 30 through an arc generally equal to the circumferential width of one tooth 46 or the circumferential spacing between two adjacent teeth 46 or in other words in the order of 10° between an unlocked position and a locked position. In the most preferred form, cylinder 52 retracts to move connector ring 30 clockwise from the unlocked position to the locked position and extends to move connector ring 30 counterclockwise from the locked position to the unlocked position. Alignment pins 36 extend from flange 18 intermediate adjacent teeth 46 of connector ring 30 in the unlocked position.

A plurality of alignment dogs 54, with six being provided in the most preferred form, are secured to the front face of flange 18 at equal circumferential spacings. Dogs 54 each have a size and shape corresponding to a tooth 46 and is positioned axially intermediate flange 18 and teeth 46. Dogs 54 are located to be positioned axially in line with corresponding teeth 46 when connector ring 30 is in an unlocked position, with connector ring 30 being rotated by cylinder 52 to a locked position in a direction to move teeth 46 such that lock portion 50 is positioned intermediate ramp portion 48 and dogs 54. In an unactuated condition, cylinder 52 prevents any tendency of connector ring 30 to rotate from the locked position to the unlocked position.

Mechanism 10 according to the preferred teachings of the present invention generally includes a second connector ring 56 which is secured to flange 24 of die 22. In the most preferred form, connector ring 56 includes an annular disc 58 having parallel front and back faces and an outer periphery of a size greater than the outer periphery of flange 24. Disc 58 is secured to flange 24 with the front face of disc 58 in an abutting relation with the back face of flange 24 by suitable bolts 59 or similar fasteners extending through apertures 26 of flange 24 and apertures 60 formed in disc 58. It should be noted that bolts 59 or similar fasteners can be omitted from apertures 26 and 60 which correspond to and slideably receive alignment pins 36. Further, bolts 59 or similar fasteners should not extend beyond the front face of flange 24 in a manner which would prevent the abutment of the front faces of flanges 18 and 24.

Connector ring 56 further includes an annular tooth disc 62 having an inner periphery of a size for receipt of the outer periphery of flange 24 and smaller than the outer periphery of disc 58. Disc 62 has a thickness between its front and rear faces generally equal to the axial spacing of teeth 46 from the front face of flange 18. The rear face of disc 62 is integrally secured to the front face of disc 58, with disc 62 being concentric to disc 58. Disc 62 includes a series of equally circumferentially spaced teeth 66 extending radially outwardly from flange 24 and terminating at radially outer free ends at a radial distance generally equal to and for receipt in cylindrical portion 40. Each tooth 66 is generally of a wedge shape in a circumferential direction and specifically includes a first ramp portion 68 and a second lock portion 70. Ramp portion 68 has an outer face which extends at an angle in the order of 45° from the front face of flange 18. Lock portion 70 has an outer face which extends at an angle in the range of 5° to 30° and in the most preferred form in the order of 5° to 15° from the front face of flange 24. Teeth 66 have circumferential widths generally equal to the circumferential spacings between teeth 46 and have circumferential spacings generally equal to the circumferential widths of teeth 46. Connector ring 56 further includes an annular finger guard 72 secured to the back face of disc 58 and having an outer periphery larger than the outer extent of teeth 66. Guard 72 has a front face for abutting with the front axial end of cylindrical portion 40 and teeth 46.

Now that the basic construction of mechanism 10 according to the preferred teachings of the present invention has been set forth, the operation and advantages of mechanism 10 can be explained. For the sake of explanation, it will be assumed that connector ring 30 is mounted on flange 18 of cooker 12 and is located in its unlocked position and that connector ring 56 is secured to flange 24 of a die 22 mounted in a head which has been separated from cooker 12. After the head has been axially aligned with discharge 14 of cooker 12, the head is moved axially such that teeth 66 axially move and pass between teeth 46 to an abutting position with the front face of teeth 66 abutting with the front face of flange 18, front faces of flanges 18 and 24 abutting, and finger guard 72 abutting with teeth 46 and cylindrical portion 40. It should be appreciated that the receipt of alignment pins 36 in apertures 26 and 60 and the abutment of teeth 66 on opposite sides of alignment dogs 54 help align and position teeth 66 between teeth 46 and hold connector ring 56 and flange 24 from rotating relative to flange 18. While in the abutting position, connector ring 30 can be rotated from its unlocked position towards its locked position. As connector ring 30 rotates, ramp portions 48 of teeth 46 will axially abut with and move circumferentially past ramp portions 68 of teeth 66 such that lock portions 50 of teeth 46 will axially abut with and move circumferentially relative to lock portions 70 of teeth 66. It should be noted that the wedged shape of teeth 46 and 66 and specifically the angled faces of portions 48, 50, 68, and 70 act to cam connector ring 56 towards connector ring 30 to draw flanges 18 and 24 to tightly abut together, with portions 50 and 70 providing a taper lock between teeth 46 and 66 with a twist-locking motion.

In the most preferred form, sensors are secured to cooker 12 to sense a locating tab secured to carrier members 38 to provide a visual indication of the position of connector ring 30 and for use in the control of cylinder 52. A pressure switch can also be provided in the hydraulic lines of cylinder 52 to provide a visual indication of the locked position of connector ring 30.

Finger guard 72 prevents the operator's fingers or other objects from being accidentally inserted between teeth 46 and/or 66 to avoid the possibility of injury or damage when connector ring 30 is rotated relative to connector ring 56.

After die 22 is connected to flange 18 to mount the head to discharge 14 utilizing mechanism 10 according to the preferred teachings of the present invention, other system components can be secured to cooker 12 and the head including but not limited to a vacuum housing for conveying the extruded product, the drive for the rotating knives of the head, guards for the head and knife drive, and the like. In the preferred form, such other system components are removably connected by fasteners which can be removed by hand, preferably without the use of tools.

In the normal operation of cooker 12, the extrusion apertures of die portion 28 of die 22 become plugged with cereal dough product and require cleaning or off-specification product will be produced. Typically, plugging of die 22 occurs every 24 to 36 hours. With 20 to 30 cookers 12 running at a particular plant, then the plugging of die 22 can occur every hour or so. To speed replacement, a spare head including a clean die 22 is typically kept in a convenient staging area. When die 22 becomes plugged, the head including plugged die 22 is removed from cooker 12 and the spare head including a clean die 22 is placed on cooker 12. The plugged die 22 is cleaned at a more convenient time and after the head including a clean die 22 is replaced on cooker 12 to reduce down time.

Prior to the present invention, when die 22 became plugged, it was necessary to remove each of the fasteners extending through apertures 20 and 26 which attached die 22 to cooker 12 to change the plugged die 22 with a clean die 22. The head including the plugged die 22 was then replaced with the spare head including the clean die 22. Then, each of the fasteners were replaced through apertures 20 and 26. This change typically took about 45 minutes to accomplish. Using mechanism 10 according to the preferred teachings of the present invention, changing a head with a plugged die 22 with a head with a clean die 22 only takes about seven minutes, with this change being accomplished by simply actuating cylinder 52 and specifically without requiring removal and replacement of fasteners between cooker 12 and die 22. Thus, there is a direct production loss of about 40 minutes multiplied by the extrudate production rate per minute for cooker 12.

In addition to this directly observable reduction in the amount of time required to change dies 22, there are numerous indirect benefits. For example, prior to the present invention, the operator of cooker 12 could not personally change die 22. Rather, one or more maintenance workers had to be found to substitute die 22. Unfortunately, maintenance workers may not be readily available when the need for the clean die 22 occurs. Thus, the operator was faced with a choice between two undesirable alternatives. First, the operator could continue to make off-specification product. In the alternative, the operator could shut down cooker 12 until maintenance workers could be found to substitute die 22. Using mechanism 10 according to the preferred teachings of the present invention, die 22 can be substituted utilizing less personnel. Thus, the time looking for maintenance workers is also recovered. This is also a significant advantage when numerour cookers 12 are desired to be started simultaneously such as following down weekends.

Another indirect advantage is an increase in product quality. Due to the time requirements and inconvenience of changing dies 22 prior to the present invention, changeovers of dies 22 do not occur as often as they should. As a result, cookers 12 having dies 22 which are partially plugged are continued to be operated, forming inferior product, until the plugging becomes more severe. Additionally, the come-up time to steady state conditions for cookers 12 can be considerable, on the order of several hours. If cooker 12 is shut down for more than a few minutes (such as for substituting die 22 prior to the present invention and/or finding maintenance workers to perform the substitution), cooker 12 can loose its steady state conditions. Specifically, the material being held in cooker 12 experiences an overcook and subsequent increase in viscosity. In order to get this overcooked product out of cooker 12, additional water must be added. When cooker 12 is restarted, an initial hour or two of production is lost as off-specification product in cooker 12 is produced/extruded to allow cooker 12 to come up to steady state conditions. With the reduced time required to replace die 22 with mechanism 10 according to the preferred teachings of the present invention, the recovery time of cooker 12 is reduced from approximately two hours to only five minutes. Thus, the total production time of cooker 12 producing specification product can be increased by at least 2-⅜ hours resulting in increased production when die 22 is replaced utilizing mechanism 10 according to the preferred teachings of the present invention over prior die replacement techniques.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Mechanism for removably securing a die to a cooker, with the die including one of first and second flanges and the cooker including the other of the first and second flanges, comprising, in combination: first and second connector rings, with the first and second connector rings each including a plurality of circumferentially spaced teeth; means for rotatably mounting the first connector ring to the first flange between a locked position and an unlocked position, with the second connector ring being secured to the second flange, with the plurality of circumferentially spaced teeth of one of the first and second connector rings extending radially inward and having radially inner free ends and the plurality of circumferentially spaced teeth of the other of the first and second connector rings extending radially outward and having radially outward free ends with the teeth of the second connector ring being axially movable between the teeth of the first connector ring in the unlocked position and axially abutting the teeth of the first connector ring in the locked position; and means for rotating the first connector ring between the unlocked and locked positions.

2. The mechanism of claim 1 further comprising, in combination: an alignment pin having a free end and extending from the first flange intermediate the teeth of the first connector ring in the unlocked position, with the alignment pin being axially slideable in an aperture formed in the second flange, with the teeth of the first connector ring being axially spaced from the first flange greater than the axial spacing of the free end of the alignment pin from the first flange.

3. The mechanism of claim 2 further comprising, in combination: at least two, circumferentially spaced, alignment dogs each of a size corresponding to a tooth of the plurality of teeth of the first connector ring, with the alignment dogs being secured relative to the first flange and positioned to be axially in line with the teeth of the first connector ring in the unlocked position and intermediate the teeth of the first connector ring in the locked position.

4. The mechanism of claim 3 wherein each of the teeth of the first and second connector rings are of a wedge shape in a circumferential direction for camming together to draw the first and second flanges together when the first connector ring rotates from the unlocked position to the locked position.

5. The mechanism of claim 4 wherein each of the teeth includes a ramp portion having a face at an acute angle to the flange and a lock portion having a face at an acute angle to the flange which is substantially less than the acute angle of the ramp portion.

6. The mechanism of claim 5 wherein the acute angle of the ramp portion is in the order of 45° and the acute angle of the lock portion is in the order of 5° to 30°.

7. The mechanism of claim 4 wherein the rotating means comprises, in combination: a clevis secured to the first connector ring; and an extendable and retractable cylinder having an end pivotally mounted to the clevis.

8. The mechanism of claim 7 wherein the rotatably mounting means comprises an annular carrier member secured to the first connector ring, with the clevis secured to the annular carrier member.

9. The mechanism of claim 8 wherein the rotatably mounting means further comprises, in combination: an annular collar member secured to the first flange and having an outer periphery, with the annular carrier member having an inner periphery slideably received on the outer periphery of the annular collar member.

10. The mechanism of claim 1 wherein each of the teeth of the first and second connector rings are of a wedge shape in a circumferential direction for camming together to draw the first and second flanges together when the first connector ring rotates from the unlocked position to the locked position.

11. The mechanism of claim 10 wherein each of the teeth includes a ramp portion having a face at an acute angle to the flange and a lock portion having a face at an acute angle to the flange which is substantially less than the acute angle of the ramp portion.

12. The mechanism of claim 11 wherein the acute angle of the ramp portion is in the order of 45° and the acute angle of the lock portion is in the order of 5° to 30°.

13. The mechanism of claim 10 comprising, in combination: at least two, circumferentially spaced, alignment dogs each of a size corresponding to a tooth of the plurality of teeth of the first connector ring, with the alignment dogs being secured relative to the first flange and positioned to be axially in line with the teeth of the first connector ring in the unlocked position and intermediate the teeth of the first connector ring in the locked position, with the teeth of the first connector ring being axially spaced from the first flange greater than the axial spacing of the alignment dogs from the first flange.

14. The mechanism of claim 10 wherein the rotatably mounting means comprises, in combination: an annular carrier member secured to the first connector ring; and an annular collar member secured to the first flange and having an outer periphery, with the annular carrier member having an inner periphery slideably received on the outer periphery of the annular collar member.

15. The mechanism of claim 10 further comprising, in combination: an alignment pin having a free end and extending from the first flange intermediate the teeth of the first connector ring in the unlocked position, with the alignment pin being axially slideable in an aperture formed in the second flange, with the teeth of the first connector ring being axially spaced from the first flange greater than the axial spacing of the free end of the alignment pin from the first flange.

16. The mechanism of claim 10 wherein the rotating means comprises, in combination: a clevis secured to the first connector ring; and an extendable and retractable cylinder having an end pivotally mounted to the clevis.

17. The mechanism of claim 16 wherein the rotatably mounting means comprises an annular carrier member secured to the first connector ring, with the clevis secured to the annular carrier member.

18. The mechanism of claim 17 wherein the rotatably mounting means further comprises, in combination: an annular collar member secured to the first flange and having an outer periphery, with the annular carrier member having an inner periphery slideably received on the outer periphery of the annular collar member.

19. The mechanism of claim 1 comprising, in combination: at least two, circumferentially spaced, alignment dogs each of a size corresponding to a tooth of the plurality of teeth of the first connector ring, with the alignment dogs being secured relative to the first flange and positioned to be axially in line with the teeth of the first connector ring in the unlocked position and intermediate the teeth of the first connector ring in the locked position, with the teeth of the first connector ring being axially spaced from the first flange greater than the axial spacing of the alignment dogs from the first flange.

20. The mechanism of claim 1 wherein the rotatably mounting means comprises, in combination: an annular carrier member secured to the first connector ring; and an annular collar member secured to the first flange and having an outer periphery, with the annular carrier member having an inner periphery slideably received on the outer periphery of the annular collar member.

* * * * *